United States Patent [19]

Hochstein

[11] 4,037,411
[45] July 26, 1977

[54] THERMAL ENERGY CONVERTING ASSEMBLY

[76] Inventor: Peter A. Hochstein, 14020 15 Mile Road, Sterling Heights, Mich. 48077

[21] Appl. No.: 654,368

[22] Filed: Feb. 2, 1976

[51] Int. Cl.² ............................................. F03G 7/06
[52] U.S. Cl. ................................................... 60/527
[58] Field of Search ........................... 60/527, 528, 529

[56] References Cited

U.S. PATENT DOCUMENTS

| | | | |
|---|---|---|---|
| 3,403,238 | 9/1968 | Buehler et al. | 60/527 |
| 3,430,441 | 3/1969 | Adams | 60/529 |
| 3,652,969 | 3/1972 | Wilson et al. | 60/527 UX |
| 3,913,326 | 10/1975 | Banks | 60/527 |

*Primary Examiner*—Allen M. Ostrager
*Attorney, Agent, or Firm*—McGlynn and Milton

[57] ABSTRACT

A thermal energy converting assembly including a support housing rotatably supporting a central hub with a plurality of temperature sensitive metal alloy strips extending radially from the hub for coacting with a cam which sinusoidally strains the strips during one phase and allows the unstraining of the strips during a second phase. The strips are made of a material which undergoes a thermoelastic, martensitic phase transformation whereby in a relatively cold condition it takes less energy to strain the strips than is produced from the strips as they become unstrained when subsequently subjected to a hotter condition. In the first embodiment the strips are strained by torsional twisting as a result of a lever arm attached to the ends of the strips and reacting with the cam whereas in the second embodiment the strips are strained by bending as push rods are associated with the distal ends of the strips and have rollers thereon for coacting with the cam.

28 Claims, 5 Drawing Figures

THERMAL ENERGY CONVERTING ASSEMBLY

This invention relates to a thermal energy converting assembly of the type for converting heat energy into mechanical energy and, more specifically, to such an assembly utilizing a plurality of temperature sensitive elements made of a material which undergoes a thermoelastic, martensitic phase transformation whereby it takes less energy for placing the elements under strain in a cold condition than the energy returned when the elements are heated to a higher temperature.

During recent years various materials comprising metal alloys have been developed which have a shape memory based upon thermoelastic, martensitic phase transformations which are stress or strain dependent. Basically, such alloys exhibit a stable shape in a phase above a given temperature and experience a transformation to a martensitic phase at a lower temperature. The alloys have a much lower modulus at the martensitic phase thereby requiring a relatively small amount of energy for straining the alloy when at the lower temperature, whereas the alloy provides much more energy as it returns to the original stable shape as it reaches a higher temperature. Examples of alloys which have this shape memory characteristic are titanium-nickel; copper-aluminum-nickel; copper-zinc; iron-platinum; and gold-cadmium. A discussion of the shape memory characteristics in a number of alloys is set forth in the Journal of Material Science; 1974, Volume 9, Page 15–21 by the authors L. Delaey, R. V. Krishnan and H. Tas. Further discussions are set forth in Metallurgical Transactions; 1975, Volume 6A, Page 29 by H. C. Tong and C. M. Wayman.

There have been efforts to utilize these materials which have shape memory characteristics in thermal energy converting assemblies; however, such assemblies have merely proved that such materials may be utilized but there has been no practical assembly which generates useful power and which may be manufactured in different sizes for different applications. One very basic assembly is disclosed in U.S. Pat. No. 3,403,238 granted Sept. 24, 1968 to William J. Buehler and David M. Goldstein, which patent merely discloses the simple concept of placing a shape memory material of nickel-titanium under stress or strain by cantilevered bending or torsional twisting at the relatively low temperature and extracting the increased energy resulting from the return of the material to its original unbent or untwisted shape. Tests have also been conducted on an assembly utilizing rods of a material having a shape memory, which rods are strained by being placed in tension at a lower temperature and contract to their original length when heated into a higher temperature. Such tests were conducted by the Lawrence Berkley Laboratory of the University of California and reported in their report NSF/Rann/SE/AG-550/FR 75/2 entitled NITINOL ENGINE PROJECT TEST BED dated July 31,1975. The shape memory material utilized in that project was 55-NITINOL from the Timet Division of the Titanium Corporation of America, Toronto, Ohio with a chemical composition of 55.38% nickel; 0.05% iron; 0.004% nitrogen and the balance titanium. This material could also be utilized in the subject invention.

The subject invention provides an improved thermal energy converting assembly utilizing such shape memory materials in a practical combination to most efficiently utilize the shape memory characteristics of the materials.

Other advantages of the present invention will be readily appreciated as the same becomes better understood by reference to the following detailed description when considered in connection with the accompanying drawings wherein.

Figure 1:
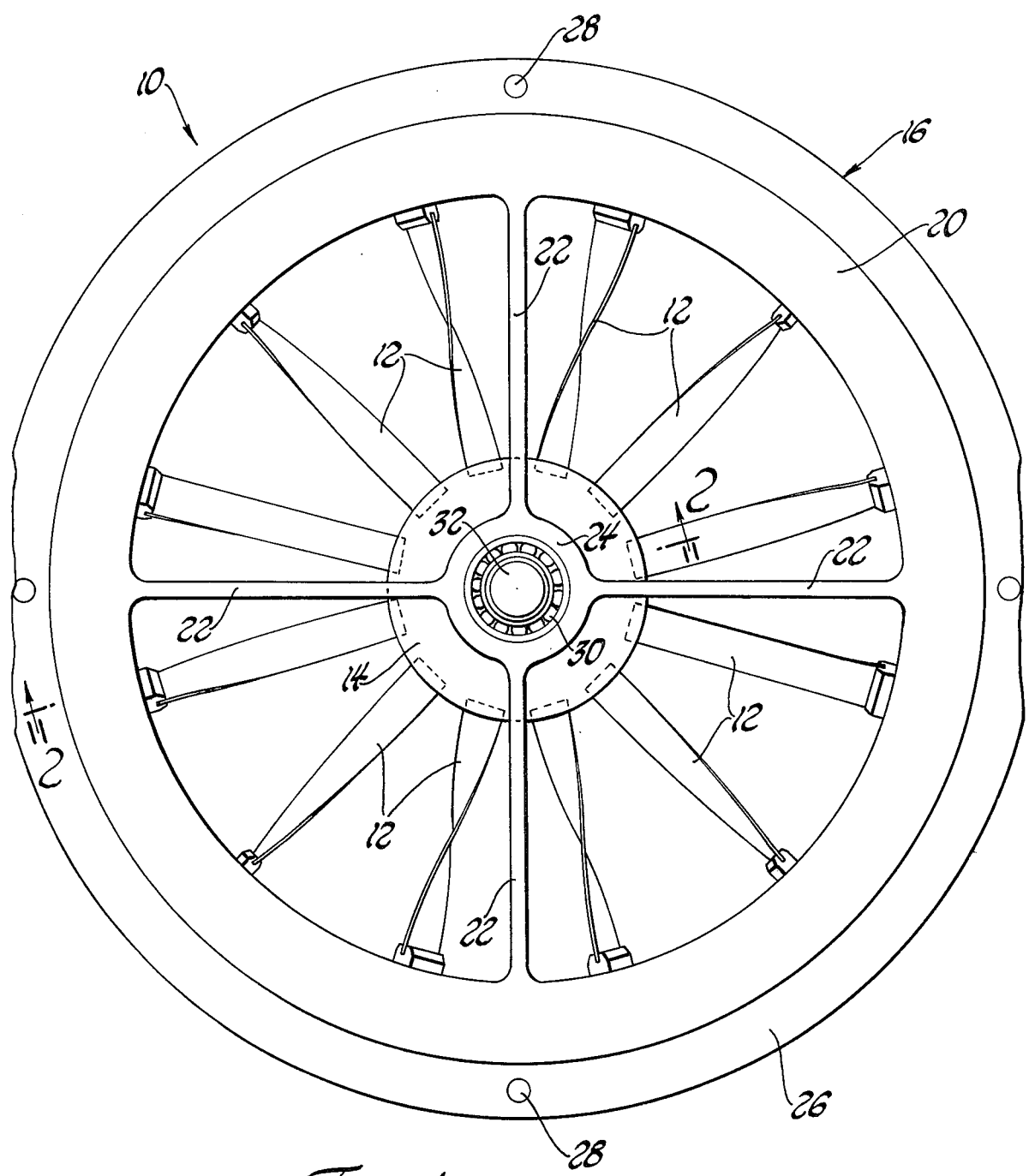
FIG. 1 is a plan view of a preferred embodiment of the subject invention.
Figure 2:
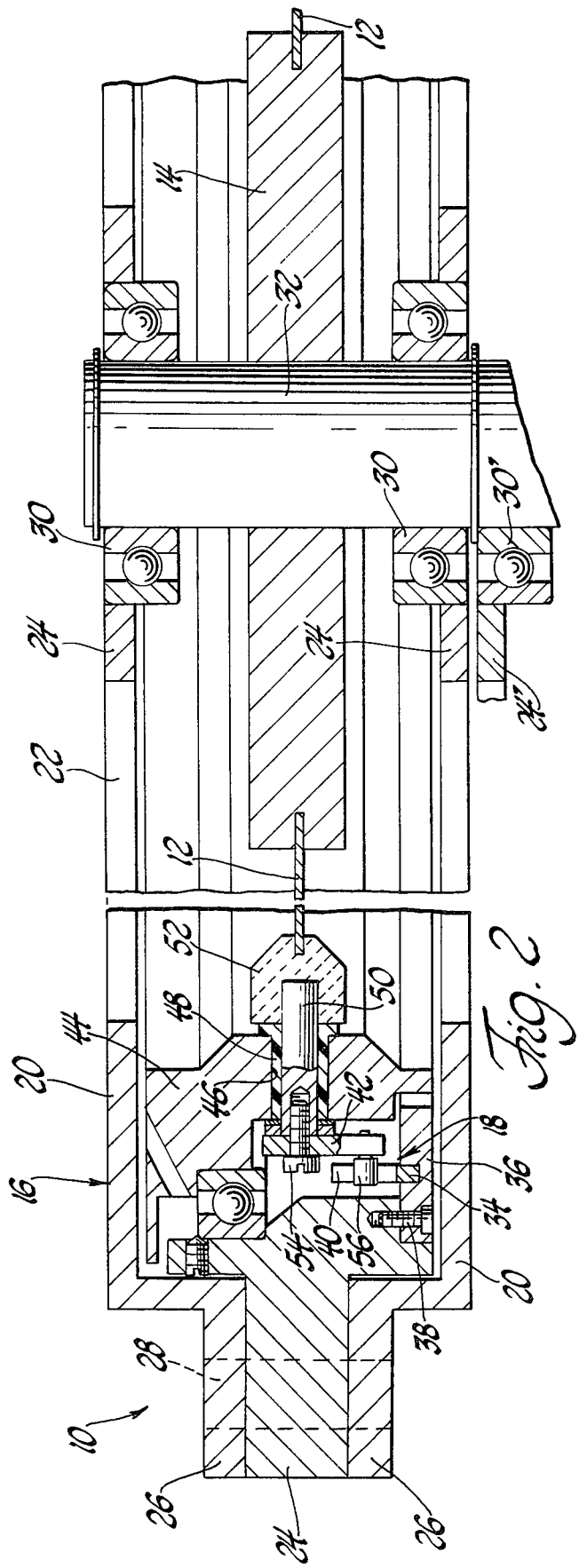
FIG. 2 is a fragmentary cross-sectional view taken substantially along line 2—2 of FIG. 1.
Figure 5:
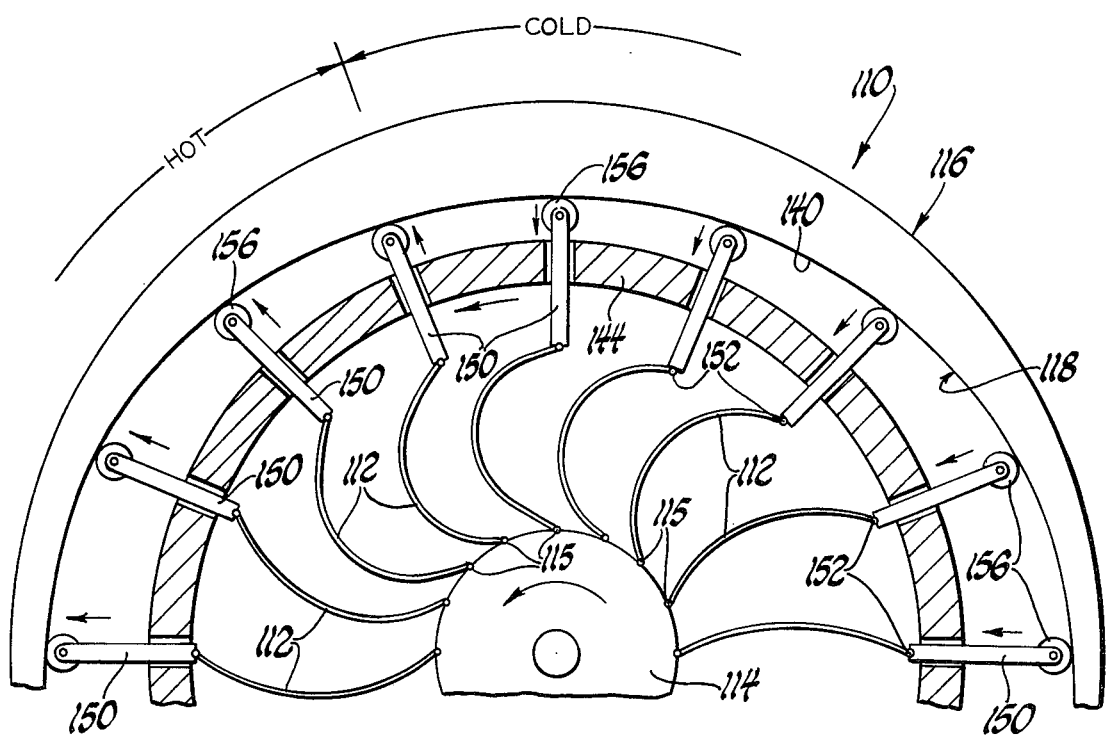
FIG. 5 is a fragmentary and partially cross-sectional view showing an alternative embodiment of the subject invention.

Referring to the drawings, the first embodiment of a thermal energy converting assembly constructed in accordance with the subject invention is generally shown at 10 in FIGS. 1 and 2 and a second embodiment is generally shown at 110 in FIG. 5.

Both embodiments 10 and 110 include a plurality of temperature sensitive elements 12 and 112. The temperature sensitive elements 12 and 112 are made of a material preferably comprising a metal alloy which undergoes thermoelastic, martensitic phase transformations, as discussed above, whereby less energy is required for straining the elements at a relatively cold temperature than may be extracted from the elements as they return to the original unstrained shape while at a higher temperature. Each of the elements 12 and 112 comprises a flat strip having a rectangular cross section.

Also included is a reaction means comprising the hubs 14 and 114 for supporting the strips 12 and 112. The inward ends of the strips 12 are secured in slots in the hub 14 by adhesive, or the like, and are fixed against movement relative to the hub 14. The strips 112 are connected by pivotal connections 115 to the hub 114.

Also included is a support means or housing generally indicated at 16 for the embodiment of FIGS. 1 and 2 and generally indicated at 116 for the embodiment of FIG. 5.

Also included is a cam means reacting with the strips 12 and 112 for straining the strips 12 and 112 during a first phase and allowing the unstraining of the strips 12 and 112 during a second phase, the cam means being generally shown at 18 in FIG. 2 and at 118 in FIG. 5.

The support means 16 and 116 support the hubs 14 and 114 and the cam means 18 and 118 for movement relative to one another whereby energy may be extracted during the unstraining of the strips 112. The cam means 18 is a separate component from the housing 16 and the cam means 118 may be a separate component from the housing 116 in a similar fashion or may be an integral part thereof. In other words, although not illustrated in detail, the housing defining the support means 116 in the embodiment of FIG. 5 may be similar to the support means 16 of the first embodiment. More specifically, the support means supports the hubs 14 and 114 for rotational movement relative to the stationary housings 16 and 116. The strips 12 and 112 extend generally radially from the hubs 14 and 114 and are disposed adjacent to one another annularly about the axis of rotation of the hubs 14 and 114 whereby the hubs 14 and 114 rotate with the elements 12 and 112 about their respective axes of rotation.

The housing 16 includes a pair of spider members 20 which include radial spokes 22 which are, in turn, integrally connected to bearing support portions 24. A cam support member 24 is sandwiched between flanges 26 of the members 20 and appropriate fasteners such as bolts, or the like, extend through the holes 28 for securing the parts together. The bearing support portions 24 are secured to the outer races of the bearings 30 for supporting the bearings 30 and the inner races of the bearings 30 are, in turn, secured to and support a shaft 32. The shaft 32 is rigidly secured to the hub 14 whereby the hub 14 rotates the shaft 32.

The shaft 32 may extend downwardly through a second set of bearings 30' which, in turn, are supported by the bearing support portions 24' of a second assembly whereby a plurality of such assemblies may be stacked vertically. A single shaft 32 may extend vertically through all the assemblies or each assembly may rotate a separate shaft which is, in turn, geared to a main drive shaft as the independent assemblies may rotate at different rotational speeds. Thus, there may be a second plurality of temperature sensitive strips extending radially from the axis of rotation of the shaft 32 and spaced axially from the first plurality of strips 12 so as to be disposed on the opposite side of a plane from the first plurality of strips 12, the plane being between the first and second plurality of strips. There will, of course, be included a strip straining means such as the cam means 18 for straining the strips of each plurality and reacting to the unstraining of the strips for causing the first and second plurality of strips to rotate about the axis of the shaft 32.

The cam means 18 is disposed annularly in a circle about the axis of rotation of the assembly and is disposed or spaced radially outwardly from the hub 14. In a similar fashion, the cam means 118 is disposed annularly about the axis of rotation and is spaced radially outwardly from the hub 114. The support means 16, and although not shown, the support means 116 also, because of their spider-like configuration, define passages between the spokes 22, the bearing support portion 24 and its outward circumference for allowing the free flow of fluid over the strips 12 and 112 in a direction axial to the assembly, i.e., parallel to the axis of rotation. As will be appreciated, when a plurality of assemblies 10 are stacked axially of one another, a fluid such as a liquid may pass vertically downwardly over the first plurality of strips 12 and then downwardly over the second axially spaced plurality of strips in the next adjacent assembly. As will become more clear hereinafter, each of the assemblies is divided into hot and cold zones with each zone including a portion or arc of the circumference of the assembly. When the assemblies are axially stacked, a heating fluid may pass down through successive assemblies 10 and as it contacts the strips in the successive units it will lose energy by a reduction in temperature. However, by designing the strips 12 in successive units to respond to different temperatures each successive assembly 10 will operate most efficiently.

Referring now to the embodiment of FIGS. 1 and 2, the cam means 18 includes a circular cam member 34 which is fixedly secured to an annular plated 36 and the plate 36 is removably attached to the cam support member 24 by fasteners 38. Thus, the cam 34 is removably supported by the support means. The cam 34 presents an axially facing cam surface 40 for straining the strips 12 torsionally twisting the strips 12 about their longitudinal axes. The cam means 18 is a part of a torsion means operatively connected to the radially outwardly distal or second ends of the strips 12 for torsionally twisting the strips 12 along their longitudinal axes during a first phase while allowing the untwisting or unstraining of the strips 12 during a second phase. Thus, the strips 12 move about the axis of rotation of the assembly, i.e., the axis of the shaft 32, while alternately twisting and untwisting and, as will become more clear hereinafter, the torsion means causes the twisting and allows the untwisting of each of the strips 12 a plurality of occurrences during each revolution of each strip 12 about the axis of rotation. In other words, the cam 34, because of its configuration, sinusoidally twists and allows the untwisting of the strips 12 as they move about the axis of rotation. The torsion means includes a lever arm 42 fixedly connected to the radially outward end of each of the strips 12 for reacting with the surface 40 of the cam 34. More specifically, there is included a cage means or member 44 which is rotatably supported in the housing through bearing 46 and cam support member 24. The cage member 44 has a plurality of bores 46 extending radially therethrough and a plurality of bushings 48 are disposed therein. A shaft 50 is rotatably supported in each bushing 48 to thereby be rotatably supported by the cage 44. A member 52 preferably made of a thermally nonconductive material fixedly interconnects the outward distal end of each strip 12 to an adjacent shaft 50 whereby each shaft 50 must rotate in accordance with the twisting movement of the strip 12 to which it is attached. Each lever arm 42 is fixedly attached to the outward end of a shaft 50 by a threaded bolt 54 whereby each shaft 50 is rotatably supported by the cage 44 and fixedly or nonrotatably interconnects the radially outward end of an adjacent strip 12 with an associated lever arm 42. A roller 56 is rotatably supported at the distal end of each lever arm for engaging the cam surface 40.

Figure 3:
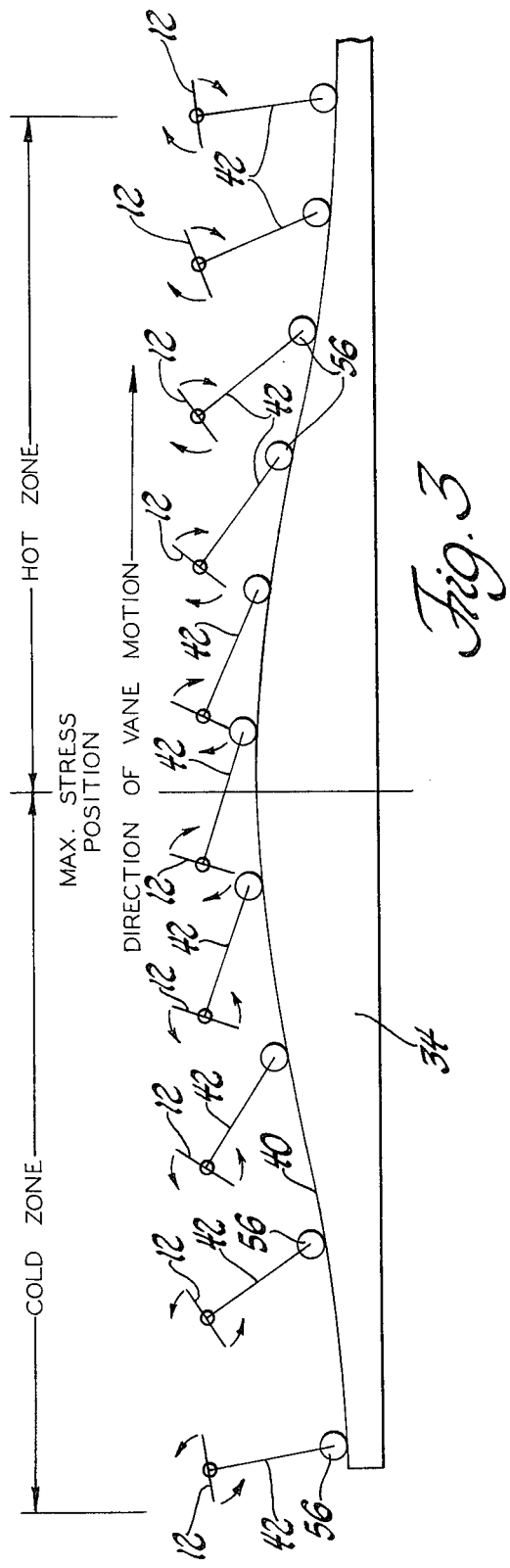
FIG. 3 is a schematic illustration and layout illustrating the operation of the embodiment of FIGS. 1 and 2.

Referring now to FIG. 3, there is shown schematically the basic operation of the embodiment of FIGS. 1 and 2. On the extreme left-hand portion, the first lever arm 42 is shown in its initial position as it is entering into a cold zone for straining the elements 12 in a first phase. It will be noted that the vertical spacing or axial spacing between the cam surface 40 of the cam 34 and the strips 12 is such to prevent the lever arms 42 from reaching a vertical position parallel to the axis of rotation. This provides a slight pre-straining or stressing of each element 12 which causes the cam follower roller 56 to bear upon the cam surface 40 and assures that the assembly will always rotate in the same direction.

As the strips 12 move through the cold zone from left to right, as viewed in FIG. 3, the lever arms 42 move more toward a horizontal position by reaction with the cam surface 40 thereby straining the strips 12 by torsionally twisting the strips 12 while they are in a relatively cold environment. As the strips 12 move through the cold zone they are in a first phase and at a lower temperature which requires less energy for straining the strips than will be expanded from the strips as they pass through the hot zone. As the strips 12 move into the hot zone they pass into the second phase where they are experiencing their shape memory characteristic to return to their normal or original shape while at the higher elevated temperature thereby rotating the lever arms 42 in the clockwise direction to force the rollers 56 against the cam surface which is receding away from the axes of the strips 12 which, in turn, causes a force vector tending to move the strips 12 to the right, as indicated, which, in the assembly as shown in FIG. 1, would be a counterclockwise rotation. The cold zone as represented in FIG. 3 may occupy one quadrant or one-quarter of the circumference of the assembly 10 and each hot zone occupies a quadrant whereby during one complete revolution each strip 12 is twisted and untwisted twice. Thus, there are a plurality of occurrences of the twisting during each revolution of a strip 12 about the axis of rotation of the assembly.

As will be appreciated, the cold and hot zones may be established by different fluids such as bi-liquids, liquids or gases or any combination thereof. It is also important that there not be thermal heat losses in the assembly between the cold and hot zones. Thus, all possible components of the assembly 10 are made of low specific heat, low mass and low thermal conductivity materials such as glass fiber reinforced plastics, etc.

The power generated by the assembly 10 is a function of: (1) the temperature differential that exists between the hot and cold zones, (2) the thermal characteristics of the thermoelastic strips 12, (3) the rate of heat exchange between the thermal media and the strips 12 and (4) the parasitic heat losses of the assembly resulting from heat being transferred from the hot zone to the cold zone with no net work output.

Referring now to the embodiment of FIG. 5, the cam means 118 presents a radially facing cam surface 140 for straining the strips 112 by cantilever bending to place the strips 112 in an arc, as illustrated. The assembly 110 includes a cage means or member 144 which is supported for rotation with the hub 114 in a fashion similar to the hub 44 of the embodiment of FIGS. 1 and 2. The cage member 144 includes a plurality of radially extending bores in which are disposed a plurality of radially extending push rods 150 slidably supported in those bores. Each strip 112 has its radially outwardly distal end connected to one of the push rods by a pivotal connection 152. Rollers 156 are rotatably connected to the outward distal ends of the push rods 150 for rolling engagement with the cam surface 140 whereby the push rods react with the cam surface 140 radially outwardly of the cage member 144.

As illustrated in FIG. 5, the rotation of the hub 114 is in a counterclockwise direction whereby the push rods 150 reacting with the cam surface 140 strain the strips 112 by bending to increase their arc from one end to the other as the cam surface 140 radially approaches the axis of rotation to a point where this radial distance is minimal adjacent the division between the cold and hot zones. Actually, the cam surface 140 is closest to the axis of rotation of the hub 114 a few degrees prior to the division between the cold and hot sections to assure that the assembly always rotates in a counterclockwise direction. Thus, after each strip 112 has been strained to its maximum degree, it is moved into the hot zone and subjected to a higher temperature. As the strips 112 pass through the hot zone they move into a second phase where they experience their shape memory characteristics to return to the straighter configuration thus forcing the push rods 150 radially outwardly against the cam surface 140 which is moving away from the axis of rotation thereby creating a reaction force tending to rotate the hub 114.

As in the case of the embodiment of FIGS. 1 and 2, the embodiment of FIG. 5 may also include a plurality of cold zones as well as a plurality of hot zones circumferentially about the assembly and the cam surface 140 will be configured to correspond with the number of hot and cold zones.

Figure 4:
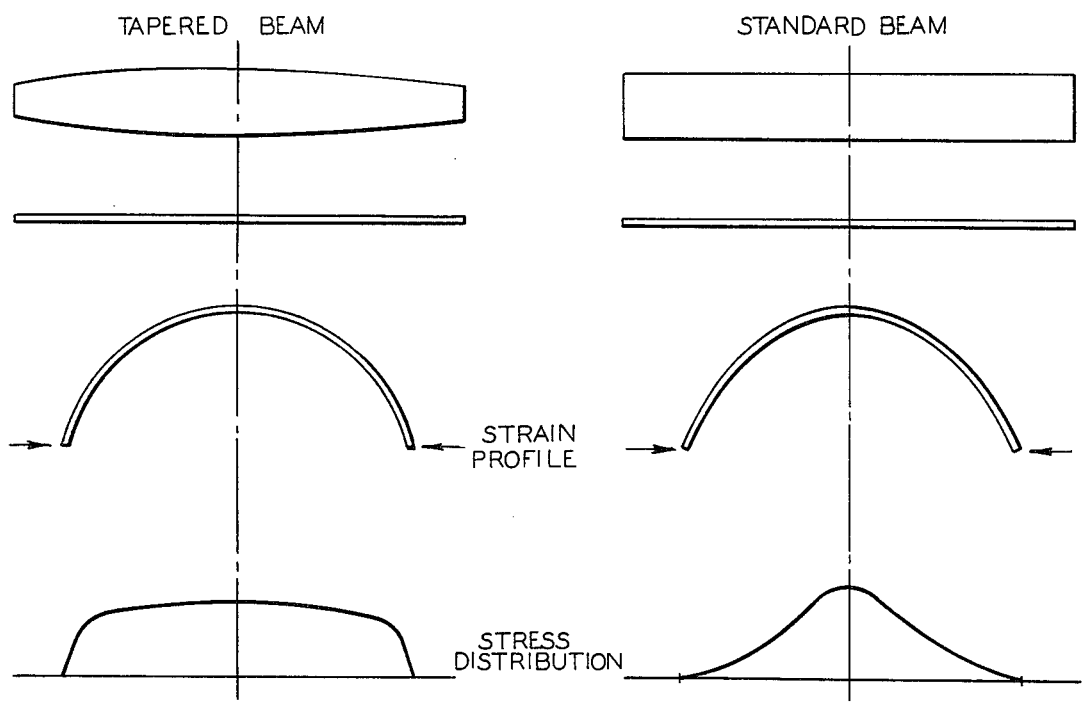
FIG. 4 is a comparative illustration of the strain profile and stress distribution in shape memory elements having different cross-sectional configurations.

The right-hand portion of FIG. 4 shows a standard beam and its stress profile and stress distribution which is clearly uneven over the length of the beam. This means that the standard beam is unevenly stessed over its length and a significant portion of the length of the element is unstressed and merely parasitically transfers heat in the assembly. In other words, the working length of the standard beam of FIG. 4, if made of a thermoelastic, martensitic material, would be most efficient only over a portion of its length. On the other hand, the left-hand portion of FIG. 4 discloses a beam which may be utilized as a strip 112 having a varying cross section therealong thereby to maintain a substantially uniform stess level along its length during the straining. More specifically, the tapered beam tapers outwardly to decrease in cross-sectional area from the ends thereof toward the mid portion so that the stress distribution is more substantially uniform between the ends of the beam thereby utilizing the entire length of the beam to experience straining and thereafter to produce energy or work while moving into the second phase in a hot zone where it becomes unstrained and returns to its memorized shape.

The utilization of flat strips 12 and 112 having a generally rectangular cross section provide an optimum surface to volume ratio for maximizing the rate of heat transfer. The variance of the cross section along the beam, as illustrated in FIG. 4, causes the stress distribution along the strips to be made substantially constant so that there is a more efficient volumetric utilization of the material.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A thermal energy converting assembly comprising: a plurality of temperature sensitive elements made of material which undergoes thermoelastic, martensitic phase transformation; reaction means for supporting said elements; cam means reacting with said elements for straining said elements during a first phase and allowing the unstraining of said elements during a second phase, and support means supporting said reaction means and said cam means for allowing relative movement between said elements and said cam means to extract energy as said elements react with said cam means during said unstraining of said elements.

2. An assembly as set forth in claim 1 wherein said support means supports said reaction means and said cam means for rotational movement relative to one another about an axis of rotation.

3. An assembly as set forth in claim 2 wherein said elements are disposed adjacent to one another annularly about said axis of rotation.

4. An assembly as set forth in claim 3 wherein said reaction means and said elements rotate about said axis of rotation.

5. An assembly as set forth in claim 4 wherein said cam means causes straining of each of said elements a plurality of occurrences during each revolution of each element about said axis.

6. An assembly as set forth in claim 4 wherein said support means defines passages for the flow of fluid axially through said assembly.

7. An assembly as set forth in claim 4 wheerin said reaction means includes a hub rotatably supported by said support means for rotation about said axis, said elements extending generally radially from said hub.

8. An assembly as set forth in claim 7 wherein said cam means is disposed annularly about said axis and is spaced radially outwardly from said hub.

9. An assembly as set forth in claim 8 wherein said support means defines passages radially between said hub and said cam means for allowing the flow of fluid over said elements axially of said assembly.

10. An assembly as set forth in claim 9 wherein each of said elements comprises a flat strip.

11. An assembly as set forth in claim 10 wherein said cam means presents an axially facing cam surface for straining said strips by torsionally twisting said strips about their longitudinal axes.

12. An assembly as set forth in claim 10 wherein said cam means presents a radially facing cam surface for straining said strips by bending so as to place strips in an arc.

13. An assembly as set forth in claim 12 wherein each of said strips has a various cross section therealong for maintaining substantially uniform stress levels in said strips during said straining thereof.

14. An assembly as set forth in claim 12 including cage means supported for rotation with said hub, a plurality of radially extending push rods slidably supported by said cage means, each of said strips being connected to one of said push rods, said push rods reacting with said cam surface radially outwardly of said cage means.

15. An assembly as set forth in claim 14 including rollers rotatably connected to said push rods and in rolling engagement with said cam surface.

16. A thermal energy converting assembly comprising: a plurality of temperature sensitive flat strips made of material which undergoes thermoelastic, martensitic phase transformations; reaction means for fixedly supporting a first end of each of said strips; torsion means operatively connected to a second end of each of said strips for torsionally twisting said strips along the longitudinal axes thereof during a first phase and allowing the untwisting of said strips during a second phase; support means for rotatably supporting said reaction means for rotation about an axis of rotation so that said strips move about said axis while twisting and untwisting.

17. An assembly as set forth in claim 16 wherein said support means defines passages for the flow of fluid axially through said assembly.

18. An assembly as set forth in claim 16 wherein said reaction means includes a hub rotatably supported by said support means, each of said strips extending radially from said hub.

19. An assembly as set forth in claim 18 wherein said torsion means is disposed annularly about said hub and in radially spaced relationship thereto.

20. An assembly as set forth in claim 19 wherein said support means defines passages radially between said hub and said torsion means for allowing the flow of fluid over said strips axially of said assembly.

21. An assembly as set forth in claim 19 wherein said torsion means causes said twisting and allows said untwisting of each of said strips a plurality of occurrences during each revolution of each strip about said axis of rotation.

22. An assembly as set forth in claim 19 wherein said torsion meahs includes cam means for sinusoidally twisting and allowing untwisting of said strips.

23. An assembly as set forth in claim 22 wherein said torsion means includes a lever arm fixedly connected to the radially outward end of each of said strips and reacting with said cam means.

24. An assembly as set forth in claim 23 wherein said cam means presents an axially facing cam surface which is circularly disposed about said axis of rotation and said lever arms extend transversely to said strips.

25. An assembly as set forth in claim 24 including a roller rotatably supported on the distal end of each of said lever arms for engaging said cam surface.

26. An assembly as set forth in claim 25 wherein the axial spacing between said cam surface and said strips is such as to prevent said lever arms from reaching a vertical position parallel to said axis.

27. An assembly as set forth in claim 26 wherein said cam means is removably supported by said support means.

28. An assembly as set forth in claim 27 including cage means rotatably supported by said support means, a plurality of shaft means rotatably supported by said cage means for fixedly interconnecting the radially outward ends of said strips with said lever arms.

* * * * *